C. A. IVES.
FLUID PRESSURE BRAKE APPARATUS.
APPLICATION FILED NOV. 26, 1918.
1,334,862.
Patented Mar. 23, 1920.
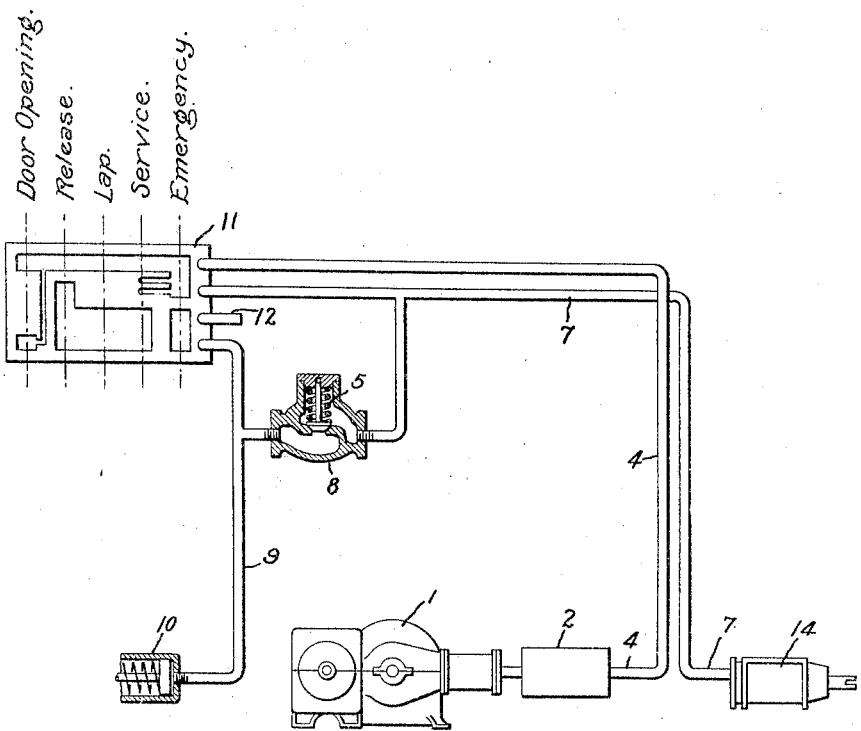
Inventor:
Charles A. Ives,
by
His Attorney

UNITED STATES PATENT OFFICE.

CHARLES A. IVES, OF ERIE, PENNSYLVANIA, ASSIGNOR TO GENERAL ELECTRIC COMPANY, A CORPORATION OF NEW YORK.

FLUID-PRESSURE-BRAKE APPARATUS.

1,334,862.    Specification of Letters Patent.    Patented Mar. 23, 1920.

Application filed November 26, 1918. Serial No. 264,213.

*To all whom it may concern:*

Be it known that I, CHARLES A. IVES, a citizen of the United States, residing at Erie, in the county of Erie, State of Pennsylvania, have invented certain new and useful Improvements in Fluid-Pressure-Brake Apparatus, of which the following is a specification.

My invention relates to a fluid pressure brake system and has for its object the provision of means for maintaining the brake cylinders supplied with sufficient air to keep the brakes applied while the doors of the car are open.

It has been the practice to provide the motorman's valve with a small port which connects the main reservoir to the train line when the motorman's valve handle is in the door opening position. In this way air is supplied to the brake cylinders to hold the brakes applied while the doors are open. This arrangement, however, has the disadvantage that if the motorman's valve handle is left in the door opening position for a sufficient length of time, the brake cylinder is charged to the reservoir pressure, and, therefore, a considerable amount of air is wasted as it is only necessary to have enough air in the brake cylinder to keep the brakes applied.

In accordance with my invention I provide means between the door opening pipe and the train pipe whereby a certain amount of fluid pressure is maintained in the brake cylinder whenever there is fluid pressure in the door opening pipe. This means, however, is constructed so that fluid under pressure cannot flow from the train pipe to the door opening pipe when the fluid pressure in the door opening pipe is exhausted or reduced. The means which I prefer to use is a differential valve which is arranged to be opened by the pressure in the door opening pipe to allow sufficient fluid to flow into the brake cylinder to keep the brakes applied.

My invention will best be understood by reference to the accompanying drawing which shows my invention embodied in a straight air brake system. I do not wish, however, to have it understood that my invention is limited to this particular system as it may be embodied in other fluid pressure systems.

In the drawings, 1 represents an air compressor which is connected to the main reservoir 2. 11 represents a diagrammatic view showing the development of a motorman's valve which is well adapted to control the operation of the brake system. The view shows the development of a cylinder in which the emergency port is next to the door-opening port, but the movement of the handle of the valve is limited in any suitable manner so that it can be moved only as far as the door opening position in one direction and as far as the emergency position in the other direction. The motorman's valve 11 is provided with four pipes as follows: reservoir pipe 4, which is connected to the reservoir 2; train pipe 7 which is connected to the brake cylinder 14; exhaust pipe 12 which is connected to atmosphere; and door opening pipe 9 which is connected to a door opening mechanism 10.

The positions of the motorman's valve 11 are as follows, beginning at the extreme left: door opening position in which the reservoir pipe 4 is connected to the door opening pipe 9; release position in which the door opening pipe 9 and the train pipe 7 are connected to the exhaust pipe 12; lap position in which the train pipe 7 is blanked and the door opening pipe 9 is connected to the exhaust pipe 12; service position in which the reservoir pipe 4 is connected to the train pipe through restricted ports in the valve seat, and the door opening pipe 9 is connected to the exhaust pipe 12; and emergency position in which the reservoir pipe 4 is connected to the train pipe 7 through a large port in the seat of the valve, and the door opening pipe 9 is connected to the exhaust pipe 12.

The door opening pipe 9 is connected to the train pipe 7 by a differential valve 8. This differential valve is arranged so that when the pressure in the door opening pipe 9 exceeds the pressure in the train pipe 7 and the pressure exerted by the spring 5 of the valve, the valve will be raised from its seat to allow the air in pipe 9 to flow into the pipe 7 and the brake cylinder 14. However, it will be observed that when the pressure in pipe 7 and the pressure exerted by the spring 5 together equal or exceed the pressure in the door opening pipe 9, the valve is held against its seat and the pressure in the brake cylinder will not be exhausted through pipe 9. The force exerted by the spring 5 is adjusted so that the valve is operated by full reservoir pressure in the door opening pipe 9 only when the pressure in the train pipe 7 is reduced to a predetermined value which just keeps the brake shoes in engagement with the wheels of the car.

The operation of the system shown is as follows:

When the car is running, the handle of the motorman's valve 11 is kept in the release position. If the motorman desires to make a stop, the motorman's valve 11 is moved to either the service or emergency position, depending upon the kind of a stop desired. Train pipe 7 and brake cylinder 14 are thereby supplied with air from the reservoir 2. To release the brakes the motorman's valve is moved to release position whereupon the air in the train pipe 7 and brake cylinder 14 is exhausted through the exhaust pipe 12.

Assuming that after the car has come to a stop, the doors of the car are to be opened. The handle of the motorman's valve is, therefore, moved to the door opening position, to supply air to the door opening mechanism 10 through the pipe 9. This door opening mechanism is arranged to open the doors of the car when air is supplied thereto and to close the doors when air is exhausted therefrom. It will be assumed that the brakes are still applied when the car comes to a stop and, therefore, the handle of the motorman's valve will be in either the emergency, service or lap position. When the handle is moved to the door opening position the train pipe 7 is momentarily connected to the exhaust pipe 12 while the motorman's valve is moving through the release position, but the communication between the exhaust pipe 12 and the train pipe 7 is maintained for such a short time, however, that the pressure in the brake cylinder is not reduced.

If while the doors of the car are open, the pressure in the brake cylinder 14 and the train pipe 7 is reduced, due to leakage or some other cause, so that the pressure on the top of the valve 8 is less than the pressure in the door opening pipe 9, the differential valve is operated by the latter pressure to recharge the train pipe 7 and brake cylinder to the predetermined pressure to maintain the brakes applied. When the pressure in the train pipe 7 again reaches the predetermined pressure, the differential valve 8 is closed. It will be observed, therefore, that as long as the doors are open, the brake cylinder 14 will be charged through the differential valve 8 with sufficient air to maintain the brakes applied. To release the brakes and close the doors the handle of the motorman's valve is moved to release position.

It will now be assumed that the motorman's handle is moved to the door opening position when the brakes are not applied. Air will be applied to the door opening mechanism 10 to open the doors in the manner above described. The differential valve 8 will also be operated by the air in the pipe 9 to allow air to flow to the brake cylinder 14 until the pressure therein has reached the predetermined value at which time the valve 8 is closed. It will, therefore, be observed that if the doors are opened when the brakes are off, only enough air to apply the brakes is supplied to the brake cylinder.

It is, of course, apparent that my invention may be applied to many other systems than in the one herein disclosed, and also that many modifications may be made in the apparatus herein disclosed without departing from the spirit and scope of my invention, and, therefore, I do not wish to be limited to the specific apparatus shown but aim to cover by the terms of the appended claims all such modifications and applications.

What I claim as new and desire to secure by Letters Patent of the United States, is:

1. In a fluid pressure system for a vehicle, the combination of a brake cylinder, a door opening mechanism arranged to be operated by fluid pressure for controlling the doors of the vehicle, and means connecting said door opening mechanism and said brake cylinder and arranged to be operated by pressure in said door opening mechanism to admit fluid from said mechanism to said brake cylinder.

2. In a fluid pressure system for a vehicle, the combination of a brake cylinder, a door opening mechanism arranged to be operated by fluid pressure for controlling the doors of the vehicle, and a valve for connecting said door opening mechanism and brake cylinder and arranged to be operated by pressure in said door opening mechanism to admit fluid from said mechanism to said brake cylinder.

3. In a fluid pressure system for a vehicle, the combination of a brake cylinder, a door opening mechanism arranged to be operated by fluid pressure for controlling the doors of the vehicle, means connecting said door opening mechanism and brake cylinder and arranged to be automatically operated by pressure in said door opening mechanism to maintain sufficient fluid in said brake cylinder to keep the brakes applied while the doors of the vehicle are open.

4. In a fluid pressure system for a vehicle, the combination of a brake cylinder, a door opening mechanism arranged to be operated by fluid pressure for controlling the doors of the vehicle, and a valve connecting said door opening mechanism and brake cylinder and arranged to be automatically operated to maintain sufficient fluid in said brake cylinder to keep the brakes applied while the doors of the vehicle are open.

5. In a fluid pressure system for a vehicle, the combination of a brake cylinder, a door opening mechanism arranged to be operated by fluid pressure for controlling the doors of the vehicle, and means connecting said door opening mechanism and said brake cylinder arranged to be automatically operated to admit only enough fluid in said brake cylinder to keep the brakes applied while the doors of the vehicle are open.

6. In a fluid pressure system for a vehicle, the combination of a brake cylinder, a door opening mechanism arranged to be operated by fluid pressure for controlling the doors of the vehicle, and a valve connecting said door opening mechanism and said brake cylinder arranged to be automatically operated to admit only enough fluid in said brake cylinder to keep the brake applied while the doors of the vehicle are open.

7. In a fluid pressure system for a vehicle, the combination of a brake cylinder, a door opening mechanism arranged to be operated by fluid pressure for controlling the doors of the vehicle, a valve connecting said mechanism and brake cylinder and arranged to only allow fluid to flow from said mechanism to said brake cylinder.

In witness whereof, I have hereunto set my hand this 18th day of November, 1918.

CHARLES A. IVES.